US008524342B2

(12) United States Patent
Häger et al.

(10) Patent No.: US 8,524,342 B2
(45) Date of Patent: Sep. 3, 2013

(54) PLASTIC COMPOSITE MOULDED BODIES OBTAINABLE BY WELDING IN AN ELECTROMAGNETIC ALTERNATING FIELD

(75) Inventors: Harald Häger, Lüdinghausen (DE); Markus Pridöhl, Großkrotzenburg (DE); Guido Zimmermann, Brühl (DE); Karl Kuhmann, Dülmen (DE); Rainer Göring, Borken (DE)

(73) Assignee: Evonik Degussa GmbH, Essen (DE)

( * ) Notice: Subject to any disclaimer, the term of this patent is extended or adjusted under 35 U.S.C. 154(b) by 1226 days.

(21) Appl. No.: 12/089,926

(22) PCT Filed: Sep. 15, 2006

(86) PCT No.: PCT/EP2006/066405
§ 371 (c)(1),
(2), (4) Date: Jun. 4, 2008

(87) PCT Pub. No.: WO2007/042368
PCT Pub. Date: Apr. 19, 2007

(65) Prior Publication Data
US 2008/0292824 A1 Nov. 27, 2008

(30) Foreign Application Priority Data
Oct. 14, 2005 (DE) .......................... 10 2005 049 718

(51) Int. Cl.
*B32B 1/02* (2006.01)
*B32B 23/00* (2006.01)
*B32B 1/08* (2006.01)

(52) U.S. Cl.
USPC ....... 428/35.7; 428/34.1; 428/34.2; 428/35.9; 428/36.9

(58) Field of Classification Search
USPC ..................... 428/34.1, 34.2, 35.7, 35.9, 36.9
See application file for complete search history.

(56) References Cited

U.S. PATENT DOCUMENTS

| 5,338,611 | A | 8/1994 | Lause et al. .................... 428/412 |
| 6,689,474 | B2 * | 2/2004 | Pickett et al. ............... 428/423.7 |
| 6,746,767 | B2 * | 6/2004 | Gottfried et al. .............. 428/402 |
| 6,761,747 | B2 | 7/2004 | Gottfried et al. ................. 51/309 |

(Continued)

FOREIGN PATENT DOCUMENTS

| DE | 102 10 661 | | 5/2003 |
| GB | 2141970 | * | 1/1995 |
| WO | WO-2004056156 A1 | * | 7/2004 |

OTHER PUBLICATIONS

U.S. Appl. No. 12/674,286, filed Feb. 19, 2010, Bollmann, et al.

(Continued)

*Primary Examiner* — Marc Patterson
(74) *Attorney, Agent, or Firm* — Oblon, Spivak, McClelland, Maier & Neustadt, L.L.P.

(57) ABSTRACT

The invention relates to plastics composite moldings obtainable via welding in an alternating electromagnetic field, in which the weld is obtained with the aid of a plastics material which comprises nano-scale, magnetic oxidic particles, which are composed of aggregated primary particles, and where the primary particles are composed of magnetic metal oxide domains whose diameter is from 2 to 100 nm in a non-magnetic metal oxide matrix or non-magnetic metalloid oxide matrix.

18 Claims, 1 Drawing Sheet

(56) References Cited

U.S. PATENT DOCUMENTS

| | | |
|---|---|---|
| 7,025,842 B2 | 4/2006 | Monsheimer et al. ........ 156/73.1 |
| 7,135,525 B2 | 11/2006 | Petter et al. .................... 525/183 |
| 7,148,286 B2 | 12/2006 | Baumann et al. ............. 524/497 |
| 7,235,298 B2 | 6/2007 | Katusic et al. ................. 428/402 |
| 7,317,044 B2 | 1/2008 | Monsheimer et al. ........ 523/207 |
| 7,371,337 B2 | 5/2008 | Katusic et al. ................. 252/500 |
| 7,569,624 B2 * | 8/2009 | Kolbe et al. .................... 523/200 |
| 2003/0124281 A1 | 7/2003 | Ries et al. ..................... 428/33.7 |
| 2004/0102539 A1 | 5/2004 | Monsheimer et al. ............. 522/2 |
| 2004/0106691 A1 | 6/2004 | Monsheimer et al. ............. 522/2 |
| 2004/0137228 A1 | 7/2004 | Monsheimer et al. ........ 428/402 |
| 2004/0140668 A1 | 7/2004 | Monsheimer et al. ........ 285/256 |
| 2004/0232583 A1 | 11/2004 | Monsheimer et al. ........ 264/113 |
| 2004/0249037 A1 | 12/2004 | Kolbe et al. .................... 524/401 |
| 2005/0027050 A1 | 2/2005 | Monsheimer et al. ........ 524/430 |
| 2006/0071359 A1 | 4/2006 | Monsheimer et al. ........ 264/113 |
| 2006/0134419 A1 | 6/2006 | Monsheimer et al. ........ 428/402 |
| 2006/0189784 A1 | 8/2006 | Monsheimer et al. ........ 528/323 |
| 2006/0202395 A1 | 9/2006 | Monsheimer et al. ........ 264/497 |
| 2006/0216441 A1 | 9/2006 | Schubel et al. .................. 428/13 |
| 2006/0223928 A1 | 10/2006 | Monsheimer et al. ........ 524/416 |
| 2006/0244169 A1 | 11/2006 | Monsheimer et al. ........ 264/113 |
| 2006/0281846 A1 | 12/2006 | Hager et al. ................... 524/430 |
| 2006/0281873 A1 | 12/2006 | Alting et al. ................... 525/432 |
| 2007/0013108 A1 | 1/2007 | Monsheimer et al. ........ 264/482 |
| 2007/0094757 A1 | 4/2007 | Pridohl et al. ................. 977/775 |
| 2007/0104971 A1 | 5/2007 | Wursche et al. ............ 428/474.4 |
| 2007/0126159 A1 | 6/2007 | Simon et al. ................... 264/497 |
| 2007/0149395 A1 | 6/2007 | Kroell et al. ................... 502/304 |
| 2007/0166560 A1 | 7/2007 | Wursche et al. ............ 428/474.4 |
| 2007/0172406 A1 | 7/2007 | Pridoehl et al. ............... 423/324 |
| 2007/0172415 A1 | 7/2007 | Zimmermann et al. ...... 423/622 |
| 2007/0173581 A1 | 7/2007 | Hager et al. ................... 524/430 |
| 2007/0182070 A1 | 8/2007 | Monsheimer et al. ........ 264/497 |
| 2007/0183918 A1 | 8/2007 | Monsheimer et al. ............. 419/1 |
| 2007/0197692 A1 | 8/2007 | Monsheimer et al. .......... 524/80 |
| 2007/0199477 A1 | 8/2007 | Hill et al. ................. 106/287.13 |
| 2007/0232753 A1 | 10/2007 | Monsheimer et al. ........ 525/153 |
| 2007/0238056 A1 | 10/2007 | Baumann et al. ............. 430/313 |
| 2008/0116616 A1 | 5/2008 | Monsheimer et al. ........ 264/405 |
| 2008/0119632 A1 | 5/2008 | Baumann et al. ............. 528/328 |
| 2008/0135799 A1 | 6/2008 | Pridoehl et al. ............. 252/62.59 |
| 2008/0161469 A1 | 7/2008 | Hoss et al. ..................... 524/423 |
| 2008/0166496 A1 | 7/2008 | Monsheimer et al. ........ 427/510 |
| 2008/0166529 A1 | 7/2008 | Hager et al. ................. 428/195.1 |
| 2008/0213552 A1 | 9/2008 | Hager et al. ................... 428/313 |
| 2008/0249237 A1 | 10/2008 | Hager et al. ................... 524/606 |
| 2010/0009106 A1 | 1/2010 | Dowe et al. ................. 428/36.91 |

OTHER PUBLICATIONS

U.S. Appl. No. 09/044,797, filed Mar. 20, 1998, Brudny, et al.
U.S. Appl. No. 11/574,020, filed Feb. 21, 2007, Katusic, et al.
U.S. Appl. No. 11/720,613, filed Jun. 1, 2007, Pridoehl, et al.
U.S. Appl. No. 12/089,809, filed Apr. 10, 2008, Goering, et al.
U.S. Appl. No. 11/822,862, filed Jul. 10, 2007, Hager, et al.
U.S. Appl. No. 12/279,276, filed Aug. 13, 2008, Roos, et al.
U.S. Appl. No. 60/943,997, filed Jun. 14, 2007, Katusic, et al.
U.S. Appl. No. 12/131,425, filed Jun. 2, 2008, Monsheimer, et al.
U.S. Appl. No. 11/816,556, filed Jan. 28, 2008, Wursche, et al.
U.S. Appl. No. 12/105,672, filed Apr. 18, 2008, Simon, et al.
U.S. Appl. No. 12/192,208, filed Aug. 15, 2008, Goering, et al.

* cited by examiner

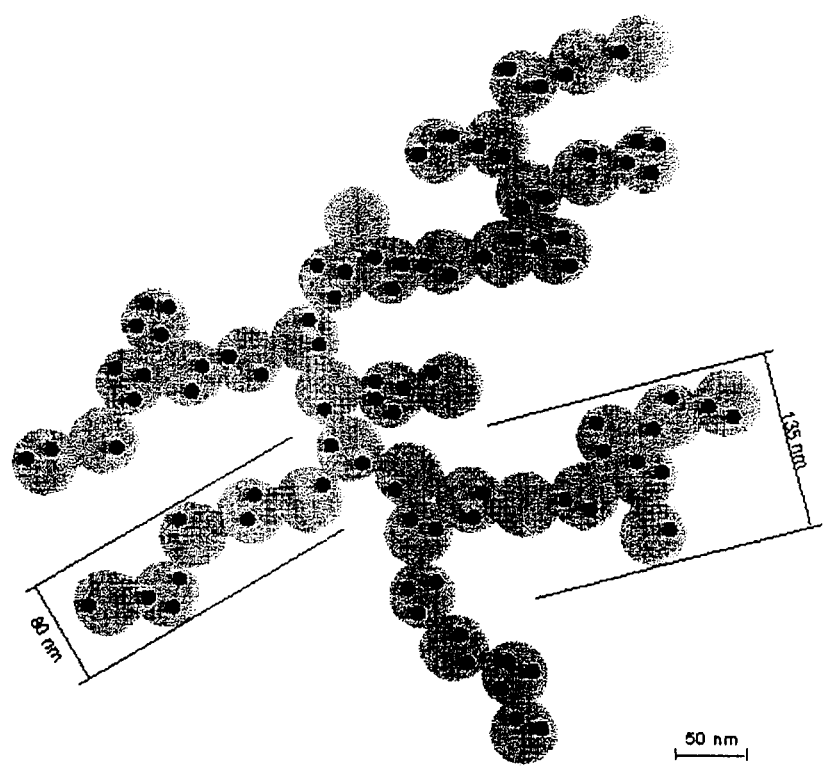

PLASTIC COMPOSITE MOULDED BODIES OBTAINABLE BY WELDING IN AN ELECTROMAGNETIC ALTERNATING FIELD

The invention relates to plastics composite mouldings obtainable via welding in an alternating electromagnetic field, where the weld is achieved with the aid of a plastics material which comprises nano-scale, magnetic oxidic particles.

Plastics mouldings can be bonded by a very wide variety of plastics welding processes. Familiar processes are heated-tool welding, heated-coil welding, ultrasound welding, vibration welding, laser transmission welding, spin welding and high-frequency welding.

Processes of jointing by means of an alternating electromagnetic field or by means of microwaves are less often used and are still considered to be specialized processes.

In the case of laser transmission welding, at least the moulding facing towards the radiation source has to be transparent to the laser beam, thus restricting the pigmentation and colouring of the plastics materials that can be used.

In contrast, the restrictions in relation to colorants do not arise in the case of welding in an automating electromagnetic field.

Welding with electromagnetic radiation (induction welding) usually requires a welding aid which is magnetically activatable per se or by virtue of appropriate ingredients. The welding aid becomes heated via hysteresis losses and/or eddy-current losses, and energy input here during inductive heating is about 1500 times higher than when conducted heat is used. The phases of induction welding include melting, melt fusion and consolidation, and the welding process can be carried out continuously or batchwise.

The welding aid can, for example, be placed in the form of sheets or foils between the joint areas of the mouldings to be joined. Magnetic activatability is often generated via metallic inclusions, but this complicates the production process of the plastics parts to be joined and these inclusions are sometimes undesirable in the downstream product. Welding aids with particulate ferromagnetic fillers are relatively expensive and exhibit poor effectiveness factors, and this has hitherto prevented the process from becoming one of the well-established jointing processes.

It was therefore an object of the invention to develop plastics materials which are magnetically activatable via appropriate additives, thus providing weldability of the same in an alternating electromagnetic field. These materials should be capable of use either in the form of integral constituents of the plastics mouldings to be joined or in the form of additional welding aids.

DE-A-19924138 claims an adhesive composition which comprises inter alia nano-scale particles with super-paramagnetic properties.

DE-A-10163399 describes a nanoparticulate preparation which has a coherent phase and at least one particulate phase composed of superparamagnetic nano-scale particles dispersed therein. Preference is given here to preparations in the form of an adhesive composition.

The compositions of DE-A-19924138 and DE-A-10163399 can be heated in an alternating electromagnetic field.

The particles used not only in DE-A-19924138 but also in DE-A-10163399 have preferably been surface-modified or surface-coated, in order to inhibit agglomeration or accretion of the nano-scale particles and/or in order to provide good dispersibility of the particulate phase in the coherent phase. A disadvantage here is that the substances used for surface coating or for surface modification can be released in particular on exposure to high temperatures and/or to high levels of mechanical action. A consequence is that the nano-scale particles can agglomerate or accrete, thus losing their superparamagnetic properties.

The rheological properties of the nanoparticulate preparation according to DE-A-10163399 or of the adhesive composition according to DE-A-19924138 can be adjusted widely via the nature and amount of the dispersion medium. However, it is impossible, or possible only to a limited extent, to adjust the rheology of the preparation via the nano-scale, super-paramagnetic particles themselves, since the super-paramagnetic properties are associated with certain particle sizes. The particles almost entirely take the form of primary particles in the preparation, and therefore the only possible method for adjusting rheology, for example thickening, at the same time involves variation in the content of superparamagnetic particles.

The previous patent application DE 102004057830 of Jan. 12, 2004, which was unpublished at the earliest priority date of the present invention, and the entire content of which is incorporated herein by way of reference, describes an adhesive composition comprising a polymerizable monomer and/or a polymer and superparamagnetic oxidic particles dispersed therein which are composed of aggregated primary particles, where the primary particles are composed of magnetic metal oxide domains whose diameter is from 2 to 100 nm in a non-magnetic metal oxide matrix or non-magnetic metalloid oxide matrix.

Surprisingly, it has now been found that nano-scale, magnetic oxidic particles are suitable additives for plastics materials, for providing weldability of the same in an alternating electromagnetic field.

Accordingly, the invention provides the use of nano-scale, magnetic oxidic particles as additives in plastics materials, for providing weldability of the same in an alternating electromagnetic field.

The invention also provides a process for the production of a plastics composite moulding via welding in an alternating electromagnetic field, in which the weld is achieved with the aid of a plastics material which comprises nano-scale, magnetic oxidic particles.

The invention in particular provides plastics composite weldings obtainable via welding in an alternating electromagnetic field, where the weld is achieved with the aid of a plastics material which comprises nano-scale, magnetic oxidic particles.

The magnetic oxidic particles are very substantially in homogeneous dispersion within the inventive plastics materials and in particular are in non-agglomerated form. Within the plastics materials, these particles are in particular stable to temperature variation and exhibit no agglomeration even at high temperatures. It is moreover possible to control the rheology of the compositions very substantially independently of the content of these particles.

For the purposes of the present invention, the term aggregated indicates three-dimensional structures of accreted primary particles. Bonding between a plurality of aggregates can give agglomerates. These agglomerates can readily be separated again via mechanical action, e.g. during extrusion procedures. In contrast to this, it is generally not possible to break down the aggregates to give the primary particles.

The diameter of the aggregates of the nano-scale, magnetic oxidic particles can preferably be greater than 100 nm and smaller than 1 μm.

It is preferable that the diameter of the aggregates of the nano-scale, magnetic oxidic particles, at least in one spatial direction, is not more than 250 nm. FIG. 1 illustrates this situation, in which the diameter of two branches of an aggregate is 80 nm and 135 nm.

The term domains indicates regions spatially separate from one another in a matrix. The diameter of the domains of the nano-scale, magnetic particles is from 2 to 100 nm.

The term nano-scale, magnetic oxidic particles in particular indicates superparamagnetic particles.

The domains can also have non-magnetic regions, but these then make no contribution to the magnetic proper-ties of the particles.

There may also be magnetic domains present which, by virtue of their size, do not exhibit any superparamagnetism, and induce remanence. This leads to an increase in volume-specific saturation magnetization. According to the present invention, the number of superparamagnetic domains present in the superparamagnetic particles is such that the inventive plastics materials can be heated to melting point by means of an alternating electrical, magnetic or electromagnetic field.

The surrounding matrix can entirely or only partially surround the domains of the superparamagnetic particles. The term partially surround indicates that individual domains can protrude from the surface of an aggregate.

The superparamagnetic domains of the particles are always non-agglomerated.

The domains can comprise one or more metal oxides.

The magnetic domains can preferably comprise the oxides of iron, cobalt, nickel, chromium, europium, yttrium, samarium or gadolinium. The form in which the metal oxides are present in these domains can be a single form or various forms.

One particularly preferred magnetic domain is iron oxide in the form of gamma-$Fe_2O_3$ ($\gamma$-$Fe_2O_3$), $Fe_3O_4$, or a mixture composed of gamma-$Fe_2O_3$ ($\gamma$-$Fe_2O_3$) and/or $Fe_3O_4$.

The magnetic domains can moreover take the form of mixed oxides of at least two metals, using the following metal components: iron, cobalt, nickel, tin, zinc, cadmium, magnesium, manganese, copper, barium, magnesium, lithium or yttrium.

The magnetic domains can moreover be substances whose general formula is $M^{II}Fe_2O_4$, in which $M^{II}$ is a metal component which encompasses at least two different divalent metals. One of the divalent metals can prefer-ably be manganese, zinc, magnesium, cobalt, copper, cadmium or nickel.

The magnetic domains can moreover be composed of tertiary systems of the general formula $(M^a_{1-x-y}M^b_xFe_y)^{II}Fe_2^{III}O_4$, where $M^a$ and, respectively, $M^b$ can be the metals manganese, cobalt, nickel, zinc, copper, magnesium, barium, yttrium, tin, lithium, cadmium, magnesium, calcium, strontium, titanium, chromium, vanadium, niobium, or molybdenum, where x=0.05 to 0.95, y=0 to 0.95 and x+y≦1.

Compounds particularly preferably present are $ZnFe_2O_4$, $MnFe_2O_4$, $Mn_{0.6}Fe_{0.04}Fe_2O_4$, $Mn_{0.5}Zn_{0.5}Fe_2O_4$, $Zn_{0.1}Fe_{1.9}O_4$, $Zn_{0.2}Fe_{1.8}O_4$, $Zn_{0.3}Fe_{1.7}O_4$, $Zn_{0.4}Fe_{1.6}O_4$ or $Mn_{0.39}Zn_{0.27}Fe_{2.34}O_4$, $MgFe_2O_3$, $Mg_{1.2}Mn_{0.2}Fe_{1.6}O_4$, $Mg_{1.4}Mn_{0.4}Fe_{1.2}O_4$, $Mg_{1.6}Mn_{0.6}Fe_{0.8}O_4$, $Mg_{1.8}Mn_{0.8}Fe_{0.4}O_4$.

There is no further restriction on the choice of the metal oxide of the non-magnetic matrix. These can preferably be oxides of titanium, zirconium, zinc, aluminium, silicon, cerium or tin.

For the purposes of the invention, the term metal oxides also includes metalloid oxides, such as silicon dioxide.

The matrix and/or the domains can moreover be amorphous and/or crystalline.

The proportion of the magnetic domains in the particles is not subject to any restriction, as long as there is spatial separation of matrix and domains. The proportion of the magnetic domains in the superparamagnetic particles can preferably be from 10 to 90% by weight.

The inventive plastics materials can preferably have a proportion of superparamagnetic particles in the range from 0.1 to 40% by weight.

Suitable superparamagnetic particles are described by way of example in EP-A-1284485, and also in DE 10317067, the entire content of which is incorporated herein by way of reference.

Accordingly, the superparamagnetic particles can be obtained via a process encompassing the following steps:
vaporization, together or separately, of a compound which comprises the metal component or metalloid component of the non-magnetic matrix and of a compound which comprises the metal component of the superparamagnetic domains, where at least one compound contains chlorine and where the constitution of the vapour corresponds to the ratio subsequently desired of superparamagnetic domains and of non-magnetic matrix,
introduction of this mixture into a mixing zone, in which it is mixed with air and/or oxygen and with a combustion gas, and introduction of the mixture into a burner of known design, and combustion of this mixture in a flame within a combustion chamber,
cooling of the hot gases and of the solid product, removal of the gases from the solid product and, if appropriate, purification of the solid product via heat-treatment by means of gases moistened with water vapour.

The particles can moreover be obtained via a process encompassing the following steps:
production of an aerosol via atomization of a precursor which comprises the metal component of the superparamagnetic domains and which takes the form of a solution or dispersion of a salt,
mixing of this aerosol with the gas mixture from a flame hydrolysis process or from a flame oxidation process, where the mixture comprises the precursor of the non-magnetic matrix, in a mixing zone, where the constitution of the vapour corresponds to the ratio subsequently desired of superparamagnetic domains and of non-magnetic matrix,
introduction of the aerosol-gas mixture into a burner of known design and combustion of this mixture in a flame within a combustion chamber,
cooling of the hot gases and of the solid product, removal of the gases from the solid product and, if appropriate, purification of the solid product via heat-treatment by means of gases moistened with water vapour,
where the precursor of the superparamagnetic domains and/or the precursor of the non-magnetic matrix is a chlorine-containing compound.

The particles can moreover be obtained via a process encompassing the following steps:
production, separately or together, of an aerosol via atomization of a precursor of the superparamagnetic domains and of a precursor of the non-magnetic matrix, where these precursors take the form of a solution or dispersion of salts, and where the constitution of the aerosol corresponds to the ratio subsequently desired of superparamagnetic domains and of non-magnetic matrix,
introduction, separately or together, of the aerosols of the precursors into a mixing zone, in which they are mixed with air and/or oxygen and with a combustion gas, and
introduction of the aerosol-gas mixture into a burner of known design and combustion of this mixture in a flame within a combustion chamber, cooling of the hot gases and of the solid product, removal of the gases from the solid product and, if appropriate, purification of the solid product via heat-treatment by means of gases moistened with water vapour, where the precursor of the superparamagnetic domains and/or the precursor of the non-magnetic matrix is a chlorine-containing compound.

Combustion gases which can be used with preference are hydrogen or methane.

With respect to weldability, the selection of the polymer materials underlying the inventive plastics material is such that the plastics material is thermoplastically softenable. The plastics material generating the weld can preferably be based on single- or two-component polyurethane, single- or two-component polyepoxide, single- or two-component silicone polymer, silane-modified polymer, polyamide, (meth)acrylate-functional polymer, polyester, polycarbonate, cyclo-olefin copolymer, polysiloxane, poly(ether) sulphone, polyether ketone, polystyrene, polyoxymethylene, polyamideimide, polytetrafluoroethylene, polyvinylidene fluoride, perfluoroethylene-propylene copolymer, perfluoroalkoxy copolymer, methacrylate/butadiene/styrene copolymer and/or liquid-crystalline copolyester.

The production method for the plastics material comprising nano-scale, magnetic oxidic particles preferably mixes, extrudes, and then pelletizes the underlying polymer materials in the form of powder or of pellets with the nano-scale, magnetic oxidic particles in the form of a powder. This form can be particularly advantageous for polyamide polymers.

The plastics material then takes the form of pellets, which can in turn be processed via extrusion to give mouldings, semifinished products, sheets, foils and the like.

The plastics material can, if appropriate, comprise not only polymers but also polymerizable monomers, water or organic dispersion media. Suitable, organic dispersion media can by way of example be selected from oils, fats, waxes, esters of $C_6$-$C_{30}$ monocarboxylic acids with mono-, di- or trihydric alcohols, saturated acyclic and cyclic hydrocarbons, fatty acids, low-molecular-weight alcohols, fatty alcohols and mixtures of these. Among these are by way of example paraffins and paraffin oils, mineral oils, linear saturated hydrocarbons generally having more than 8 carbon atoms, e.g. tetra-decane, hexadecane, octadecane, etc., cyclic hydro-carbons, e.g. cyclohexane and decahydronaphthalene, waxes, esters of fatty acids, silicone oils, etc. Preferred examples are linear and cyclic hydrocarbons and alcohols.

The plastics material which comprises the nano-scale, magnetic oxidic particles is used according to the invention as means that generates the weld during the production of a plastics composite moulding via welding in an alternating electromagnetic field.

The plastics mouldings to be joined can be composed entirely or to some extent of the plastics material comprising nano-scale, magnetic oxidic particles.

At least one of the mouldings to be joined here is composed, at least in the region of the joint area, of this plastics material.

The plastics mouldings can be produced in a manner known per se and with any desired shape.

Mouldings provided partially with the nano-scale, magnetic oxidic particles, for example only in the region of the joint areas, can be obtained by way of example via coextrusion or sequential coextrusion, multilayer extrusion, multicomponent injection moulding, or coating.

The preliminary products to be joined can by way of example be components of hollow bodies. These can then be processed to give assembled hollow bodies, such as containers, pipes or lines, which have been welded directly or by way of connecting elements, such as sleeves, fittings or flanges.

The plastics material that generates the weld can also be present separately, for example in the form of sheets or foils which are placed between sheet-like plastics parts and which bond these, as a means of welding.

The resultant plastics composite mouldings then take the form of multilayer composites composed of elements welded in the manner of a sheet, examples being sheets and/or foils.

In the corresponding process, the plastics mouldings to be joined are exposed at least in the region of the joint area to an alternating electrical, magnetic or electromagnetic field, where the plastics material that generates the weld is heated to melting point.

For the heating process, it is preferable to use an alternating electromagnetic field whose frequency is in the range from 30 Hz to 100 MHz. The frequencies of familiar inductors are suitable, examples being medium frequencies in the range from 100 Hz to 100 kHz or high frequencies in the range from 10 kHz to 60 MHz, in particular from 50 kHz to 3 MHz.

The magnetic domains and in particular the nano-particulate domains of the superparamagnetic particles permit particularly effective utilization of the energy input of available electromagnetic radiation.

This also applies by analogy to heating via alternating electromagnetic fields of microwave radiation. It is preferable here to use microwave radiation whose frequency is in the range from 0.3 to 300 GHz. In addition to the microwave radiation, it is preferable to make use of a DC magnetic field whose field strength is in the range from about 0.001 to 10 tesla, for resonant frequency setting. The field strength is preferably in the range from 0.015 to 0.045 tesla and in particular from 0.02 to 0.06 tesla.

EXAMPLE 1

Production of Superparamagnetic Particles

Particles P-1:

0.57 kg/h of $SiCl_4$ are vaporized at 200° C. and fed into a mixing zone with 4.1 $Nm^3/h$ of hydrogen, and also 11 $Nm^3/h$ of air. An aerosol which is obtained from a 25 percent by weight aqueous iron(III) chloride solution (1.27 kg/h) is also introduced by means of a carrier gas (3 $Nm^3/h$ of nitrogen) into the mixing zone, within the burner, where the homogeneously mixed gas-aerosol mixture is subjected to combustion at an adiabatic combustion temperature of about 1200° C. and with a residence time of about 50 msec. After the reaction, a known method is used to cool the reaction gases and the resultant particle powder, and this is isolated by means of a filter from the exhaust gas stream. In a further step, remaining adherent hydrochloric acid residues are removed from the powder via treatment with nitrogen comprising water vapour.

Particles P-2:

0.17 kg/h of $SiCl_4$ are vaporized at 200° C. and fed into a mixing zone with 4.8 $Nm^3/h$ of hydrogen, and also 12.5 $Nm^3/h$ of air. An aerosol which is obtained from a 25 percent by weight aqueous iron(III) chloride solution (2.16 kg/h) is also introduced by means of a carrier gas (3 $Nm^3/h$ of nitrogen) into the mixing zone, within the burner, where the homogeneously mixed gas-aerosol mixture is subjected to combustion at an adiabatic combustion temperature of about 1200° C. and with a residence time of about 50 msec. After the reaction, a known method is used to cool the reaction gases and the resultant particle powder, and this is isolated by means of a filter from the exhaust gas stream. In a further step, remaining adherent hydrochloric acid residues are removed from the powder via treatment with nitrogen comprising water vapour.
Particles P-3:

0.57 kg/h of the matrix precursor $SiCl_4$ are vaporized at about 200° C. and fed with 4 $Nm^3/h$ of hydrogen, and also 11 $Nm^3/h$ of air and 1 $Nm^3/h$ of nitrogen, into the reactor.

An aerosol composed of the domain precursors and obtained by means of a twin-fluid nozzle from an aqueous solution in which iron(II) chloride, magnesium(II) chloride and manganese chloride are present is also introduced into the reactor by means of a carrier gas (3 $Nm^3/h$ of nitrogen). The aqueous solution comprises 1.8% by weight of $MnCl_2$, 8.2% by weight of $MgCl_2$ and 14.6% by weight of $FeCl_2$.

The homogeneously mixed gas-aerosol mixture flows into the reactor, where it is subjected to combustion at an adiabatic combustion temperature of about 1350° C. and with a residence time of about 70 msec.

Residence time is calculated from the quotient of the plant volume through which the substances flow and the operating volume flow rate of the process gases at an adiabatic combustion temperature.

After the flame hydrolysis process, the reaction gases and the resultant zinc-magnesium-ferrite-doped silicon dioxide powder are cooled, and the solid is isolated by means of a filter from the exhaust gas stream.

In a further step, remaining adherent hydrochloric acid residues are removed from the powder via treatment with nitrogen comprising water vapour.

EXAMPLE 2

Production of Plastics Materials Comprising Superparamagnetic Particles

Example 2.1

2 kg of particles P-1 from Example 1 are mixed in the melt, extruded and pelletized with 8 kg of polyamide pellets (Vestamid® L1901; terminology to ISO 1874-1: PA12, XN, 18-010; Degussa AG) in a ZE25-33D twin-screw extruder from Berstorff, at 250° C. with throughput of 10 kg/h.

Example 2.2

2 kg of particles P-1 from Example 1 are mixed in the melt, extruded and pelletized with 8 kg of Vestodur® X9407 polybutylene terephthalate pellets from Degussa AG in a ZE25-33D twin-screw extruder from Berstorff, at 250° C. with throughput of 10 kg/h.

Example 2.3

2 kg of particles P-1 from Example 1 are mixed in the melt, extruded and pelletized with 8 kg of polypropylene copolymer pellets (Admer® QF551A from Mitsui Deutschland GmbH) in a ZE25-33D twin-screw extruder from Berstorff, at 200° C. with throughput of 10 kg/h.

Example 2.4

2 kg of particles P-1 from Example 1 are mixed in the melt, extruded and pelletized with 8 kg of nylon-6 pellets (Ultramid® B4 from BASF AG) in a ZE25-33D twin-screw extruder from Berstorff, at 250° C. with throughput of 10 kg/h.

Example 2.5

2 kg of particles P-1 from Example 1 are mixed in the melt, extruded and pelletized with 8 kg of polyvinylidene fluoride (DYFLOR® X7394 from Degussa AG) in a ZE25-33D twin-screw extruder from Berstorff, at 250° C. with throughput of 10 kg/h.

Example 2.6

2 kg of particles P-1 from Example 1 are mixed in the melt, extruded and pelletized with 8 kg of polyamide pellets (Vestamid® D18 from Degussa AG) in a ZE25-33D twin-screw extruder from Berstorff, at 200° C. with throughput of 10 kg/h.

Example 2.7

2 kg of particles P-2 from Example 1 are mixed in the melt, extruded and pelletized with 8 kg of polyamide pellets (Vestamid® D18 from Degussa AG) in a ZE25-33D twin-screw extruder from Berstorff, at 200° C. with throughput of 10 kg/h.

EXAMPLE 3

Welding of Plastics Mouldings in an Alternating Electromagnetic Field

General Method:

The plastics materials according to Examples 2.1 to 2.7, comprising superparamagnetic particles, were extruded to give sheets of thickness 1 mm.

Each of these sheets was alternated with a sheet of the same or different underlying plastics material (without superparamagnetic particles), and this multilayer structure was secured by the winding of adhesive tape.

The multilayer structure was then placed for prescribed times in an alternating electromagnetic field at 100% power.

The data for the inductor coil here was as follows:
Measurements: 200×45×40 $mm^3$ (L×W×H)
Material: tetragonal copper tube 10×6×1 mm
Effective cross-sectional area: 28 $mm^2$
Coil feed length: 120 mm
Number of turns on coil: 3
Coil winding length (eff.): 35 mm
Coil diameter (internal): from 20 mm to 40 mm
Internal area of coil: 720 $mm^2$
Inductance (at 100 kHz): about 270 nH
Operating frequency: 323 kHz The data for the high frequency semiconductor generator used were as follows:
Producer: STS—Systemtechnik Skorna GmbH
Model: STS type M260S
Terminal power: 6 kW
Inductance range: from 250-1200 nH
Operating frequency: from 150 to 400 kHz (323 kHz with the inductor coil used)

The following grades were used to assess adhesion after the removal of the specimen from the alternating field:

| | |
|---|---|
| 0 | No adhesion. |
| 1 | Very little adhesion. |
| 2 | Some adhesion; easy to separate. |
| 3 | Good adhesion; cannot be separated without great effort and sometimes use of tools. |
| 4 | Inseparable bonding; impossible to separate without cohesive fracture. |

EXAMPLES

| Multilayer structure using: | Welding time | Adhesion grade |
|---|---|---|
| Vestamid ® L1901 Example 2.1 | 30 seconds | 4 |
| Vestamid ® L1901 Vestamid ® L1901 Example 2.1 Trogamid ® X7323 | 45 seconds | 4 |
| Vestamid ® L1901 Example 2.1 Vestamid ® D18 | 30 seconds | 4 |
| Vestamid ® L1901 Example 2.2 Vestodur ® 2000 DYFLOR ® X7394 | 45 seconds | 4 |
| Example 2.2 Vestodur ® 2000 Vestamid ® X7297 Example 2.3 Polypropylene | 45 seconds | 4 |
| VestamidR ® X7297 Example 2.3 Ultramid ® B4 | 45 seconds | 4 |
| Vestamid ® D18 Example 2.4 Ultramid ® B4 | 30 seconds | 4 |
| Vestamid ® X7297 Example 2.5 Ultramid ® B4 | 45 seconds | 4 |
| Vestamid ® X7297 Example 2.5 Plexiglas ® 8N | 45 seconds | 4 |
| Vestamid ® X7297 Example 2.5 DYFLOR ® LE | 45 seconds | 4 |
| Vestamid ® L1901 Example 2.6 Vestamid ® D18 | 30 seconds | 4 |
| Vestamid ® L1901 Example 2.7 Vestamid ® D18 | 30 seconds | 4 |
| Vestamid ® X7297 Example 2.5 PLEXIMID ® 8815 | 45 seconds | 4 |

The invention claimed is:

1. A plastics composite molding, obtained by a process comprising welding in an alternating electromagnetic field,
wherein a weld is obtained with the aid of a plastics material which comprises a nano-scale, magnetic oxidic particle, and
wherein the plastics material that generates the weld is thermoplastically softenable,
wherein the nano-scale, magnetic oxidic particle comprises aggregated primary particles, and
wherein the primary particles comprise (i) magnetic metal oxide domains whose diameter is from 2 to 100 nm, in (ii) a non-magnetic metal oxide matrix or non-magnetic metalloid oxide matrix.

2. The molding of claim 1, wherein the nano-scale, magnetic oxidic particle comprises aggregated primary particles, and
wherein an aggregate size of the primary particles is greater than 100 nm and smaller than 1 μm.

3. The molding of claim 1, wherein the magnetic domains of the nano-scale magnetic oxidic particle comprise iron oxide.

4. The molding of claim 1, wherein the nano-scale, magnetic oxidic particle comprises a non-agglomerated superparamagnetic domain.

5. The molding of claim 1, wherein at least one nano-scale, magnetic oxidic particle is a supermagnetic oxidic particle comprising magnetic domains,
wherein the magnetic domains superparamagnetic oxidic particle comprise a ferrite.

6. The molding of claim 5, wherein the magnetic domains of the superparamagnetic oxidic particle comprise a ternary system of formula (I)

$$(M^a_{1-x-y}M^b_xFe_y)^{II}Fe_2^{III}O_4 \qquad (I),$$

wherein $M^a$ or $M^b$ is manganese, cobalt, nickel, zinc, copper, barium, yttrium, tin, lithium, cadmium, magnesium, calcium, strontium, titanium, chromium, vanadium, niobium, or molybdenum,
x is from 0.05 to 0.95,
y is from 0 to 0.95, and
$x+y \leq 1$.

7. The molding of claim 1, wherein a proportion of the magnetic domains in the nano-scale, magnetic oxidic particle is from 10 to 90% by weight.

8. The molding of claim 1, wherein a proportion of the nano-scale, magnetic oxidic particles in the plastics material that generates the weld is from 0.1 to 40% by weight.

9. The molding of claim 1, wherein the plastics material that generates the weld comprises at least one selected from the group consisting of a single-component polyurethane, a two-component polyurethane, a single- or two-component polyepoxide, a single- or two-component silicone polymer, a silane-modified polymer, a polyamide, a (meth)acrylate-functional polymer, a polyester, a polycarbonate, a cycloolefin copolymer, a polysiloxane, a poly(ether) sulphone, a polyether ketone, a polystyrene, a polyoxymethylene, a polyamideimide, a polytetrafluoroethylene, a polyvinylidene fluoride, a polyfluoroethylene-propylene copolymer, a perfluoroalkoxy copolymer, a methacrylate/butadiene/styrene copolymer, and a liquid-crystalline copolyester.

10. The molding of claim 1, in the form of an assembled hollow body, which has been welded directly or by a connecting element.

11. The molding of claim 1, in the form of a multilayer composite comprising an element welded in the manner of at least one of a sheet and a foil.

12. A process for producing the plastics composite molding according to claim 1, the process comprising:
welding a plastics material in an alternating electromagnetic field,
wherein the plastics material comprises a nano-scale, magnetic oxidic particle comprising aggregated primary particles,
wherein the primary particles comprise magnetic metal oxide domains whose diameter is from 2 to 100 nm, in a non-magnetic metal oxide matrix or non-magnetic metalloid oxide matrix, and
wherein the plastics material of the welding is thermoplastically softenable.

13. The process of claim 12, wherein at least one molding to be joined comprises at least in a region of a joint area, a plastics material which comprises a nano-scale, magnetic oxidic particle comprising aggregated primary particles,
wherein the primary particles comprise magnetic metal oxide domains whose diameter is from 2 to 100 nm, in a non-magnetic metal oxide matrix or non-magnetic metalloid oxide matrix.

14. The process of claim 12, wherein the plastics molding to be joined is exposed at least in a region of a joint area to an alternating electrical, magnetic, or electromagnetic field, wherein the plastics material that generates a weld is heated to melting point.

15. The molding of claim 10, in the form of a container, tube, or line.

16. The molding of claim 1, wherein the plastics material that generates the weld comprises at least one selected from the group consisting of a polyamide, a polyester, a polycarbonate, a cycloolefin copolymer, a poly(ether) sulphone, a polyether ketone, a polystyrene, a polyoxymethylene, a polytetrafluoroethylene, a polyvinylidene fluoride, a polyfluoroethylene-propylene copolymer, a perfluoroalkoxy copolymer, a methacrylate/butadiene/styrene copolymer, and a liquid-crystalline copolyester.

17. The molding of claim 1, wherein the plastics material that generates the weld comprises a polyamide.

18. The molding of claim 1, wherein the plastics material that generates the weld comprises a polyester.

* * * * *